Jan. 8, 1963 M. QUERCIA 3,072,151
DEVICE FOR REGULATING A FLOW OF GAS
Filed Oct. 12, 1959 2 Sheets-Sheet 1
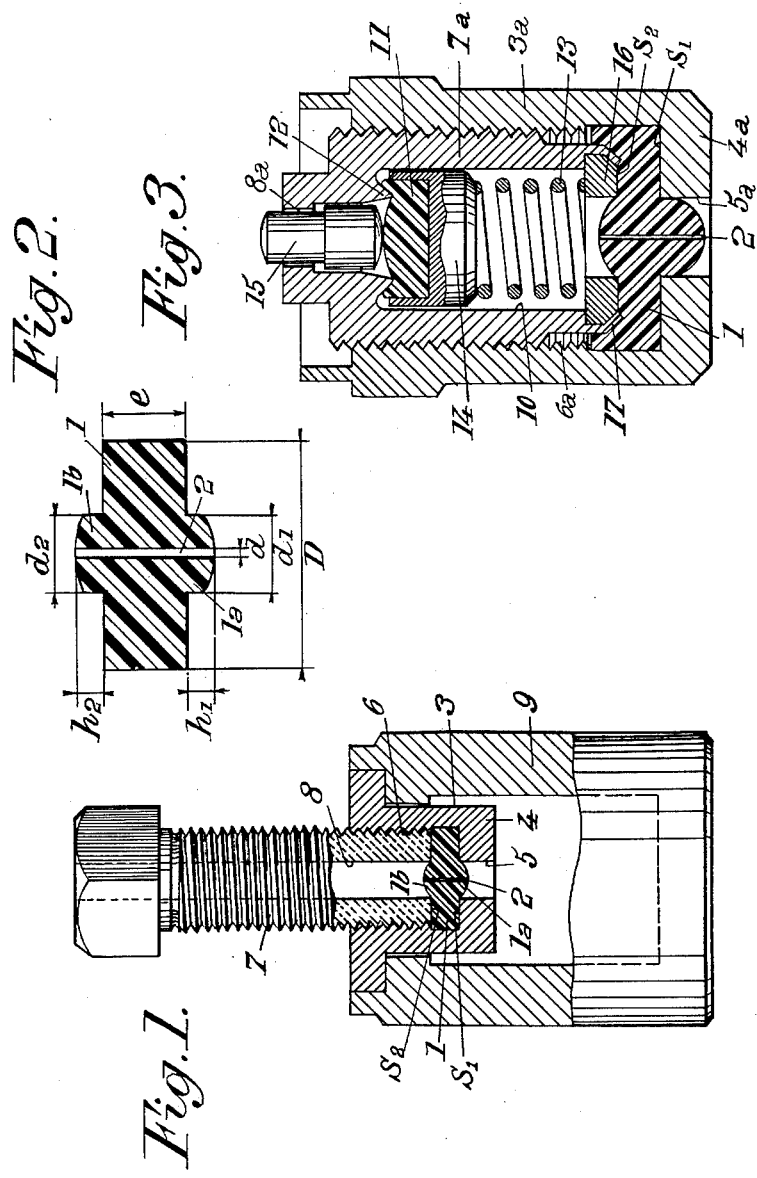

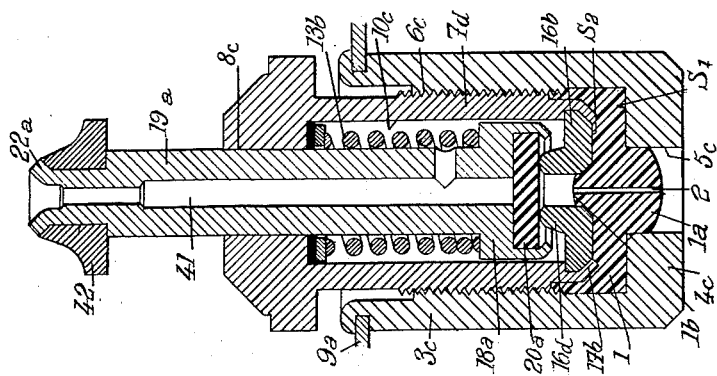
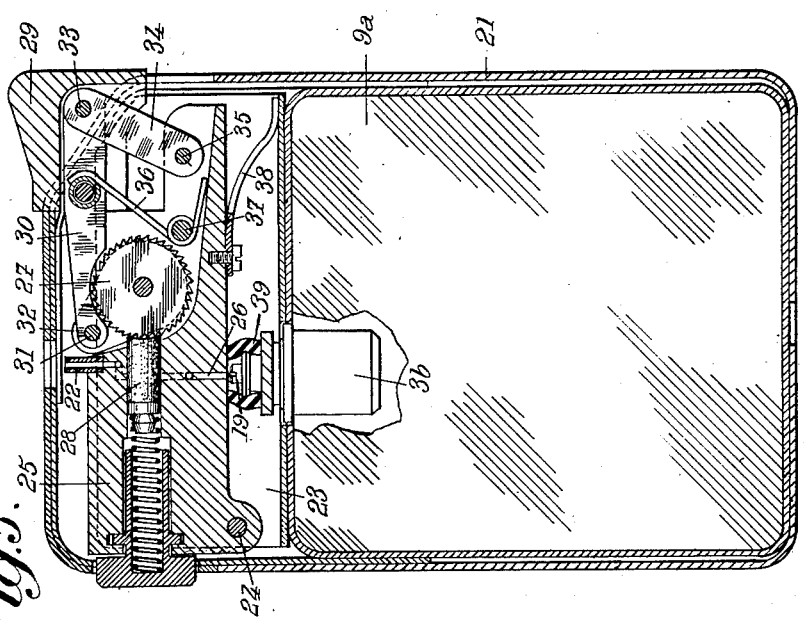
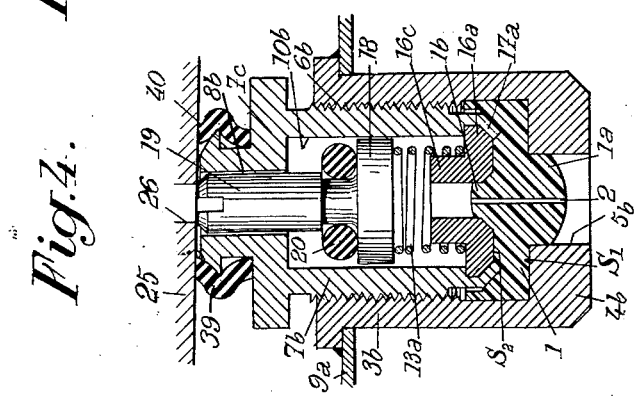

United States Patent Office 3,072,151
Patented Jan. 8, 1963

3,072,151
DEVICE FOR REGULATING A FLOW OF GAS
Marcel Quercia, Paris, France, assignor to Societe
d'Etudes et de Recherches Techniques, Paris, France, a
society of France
Filed Oct. 12, 1959, Ser. No. 845,970
Claims priority, application France Oct. 14, 1958
3 Claims. (Cl. 138—45)

The invention relates to a device for regulating the flow of a gas, particularly of a fuel gas such as butane and propane, and the invention relates more especially, though not exclusively, to a device interposed between the fuel reservoir and the burner of a gas lighter or igniter with the object of regulating the height of the flame of the said burner.

The device in accordance with the invention is primarily characterized in that it comprises a slowing-down channel for the passage of the gas, the section of the said channel being at least approximately circular and pierced through a mass of elastically-deformable material, and means adapted to apply a pressure on an annular zone of this mass surrounding the slowing-down channel, at a certain distance from the periphery of the openings of this channel, so that the said material tends to creep laterally, in particular towards the said channel, thus reducing the diameter and increasing the length of the channel until the required limitation of the rate of flow is obtained.

In accordance with a preferred form of embodiment, the elastically-deformable mass is constituted by polytetrafluoro-ethylene.

A number of forms of embodiment of gas-flow regulating devices constructed in accordance with the invention are shown in the accompanying drawings.

FIG. 1 of these drawings shows, partly in elevation and partly in axial cross-section, a regulating device constructed in accordance with a first form of embodiment.

FIG. 2 shows in axial cross-section and on a larger scale, the pastille of polytetrafluoro-ethylene of the device of FIG. 1.

FIGS. 3 and 4 respectively show in axial cross-section, two alternative forms of the device constructed in accordance with the present invention, for the expansion and regulation of the flow of fuel gas in a lighter.

FIG. 5 shows, partly in elevation and partly in cross-section, a gas lighter comprising a flow-regulating device such as the device shown in FIG. 4.

Finally, FIG. 6 shows a further alternative form of a device constructed in accordance with the invention for the expansion and regulation of the flow of fuel gas in a lighter.

The regulating device in accordance with the invention comprises a flow-retarding channel for the passage of the gas, having a section which is at least approximately circular and passing axially through a pastille 1 of a material which is elastically deformable to at least a partial extent and means adapted to apply a pressure to an annular zone of the pastille 1 which co-axially surrounds the channel 2, so that the said material tends to creep laterally on each side of the compression zone, particularly towards the channel 2, thus reducing the diameter and increasing the length of the said channel, by virtue of which the flow of gas which is compelled to pass through the channel 2 can thus be limited to the desired value.

The pastille 1 can be made of natural or synthetic rubber, of polyethylene, etc.

It is particularly advantageous, however, to employ polytetrafluoro-ethylene for the manufacture of the pastille. This material has the following chemical formula:

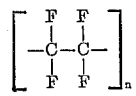

and is found in commerce under the trade-name "Teflon."

The pastille 1 is preferably given the shape of a body of revolution, while the passage 2 is arranged along the axis of revolution of the pastille.

In the case in which the gas-flow to be regulated is derived from a source in which the said gas is stored under a relatively high pressure, particularly in a liquid state, it is an advantage to employ the flow-regulating device to permit expansion of the gas.

In the particular case of a gas lighter, in order to obtain a suitable rate of flow of gas in the burner (of the order of 1 liter per hour at a supply pressure of the order of 2 kgs. per sq. cm.) it would be necessary to employ a flow-retarding channel, the internal diameter and the length of which are respectively of the order of 0.01 mm. and 3 mm. A channel of this type, which would be difficult to construct by known means, can easily be obtained by proceeding in accordance with the invention.

To this end, a pastille 1 is preferably obtained by cutting a bar of the material known as "Teflon grade 6" for example, and a channel having a substantially larger diameter, for example of the order of 0.5 mm., is then pierced in the said pastille 1; the annular zone surrounding the channel 2 is then compressed between two annular surfaces $S_1$ and $S_2$ which oppositely face each other and have an internal diameter which is substantially larger than the diameter of the channel, so as to cause the material constituting the pastille to creep laterally and thus to reduce the section of the channel to the very small value which corresponds to the desired expansion. After interruption of the said compression, the pastille remains permanently deformed, but it nevertheless retains such elastic properties as to allow the above-mentioned diameter to be adjusted with accuracy by using adjustable clamping means, preferably of the screw type.

In accordance with the form of embodiment of FIG. 1, the device comprises a flanged member 3 the bottom portion 4 of which forms, round an orifice 5, an annular inner surface $S_1$ on which is provided a threaded internal bearing surface 6, and a screw 7 through which passes a longitudinal bore 8 and which is provided at its end portion with an annular surface $S_2$ around the bore 8. The pastille 1 is placed between the surfaces $S_1$ and $S_2$. The flanged member 3 forms the fluid-tight plug of a storage reservoir 9.

The following tests have been carried out on a device of this type using a pastille 1 provided with extensions $1_a$ and $1_b$ adapted to pass respectively into the orifice 5 and the bore 8, the said pastille having the dimensions given below (see FIG. 2) before being subjected to the permanent deformation mentioned previously:

External diameter $D=5.1\pm0.05$ mm.;
Thickness $e=1.8$ mm.;
Diameter $d$ of passage $2=0.4$ mm.;
Heights of extensions $1_a$ and $1_b$: $h_1=h_2$;
Diameters of said extensions: $d_1=d_2=2$ mm.

The pastille 1 is placed in position on the end portion 4 and the screw 7 is screwed into contact with the pastille 1 without being tightened. The free extremity of the screw 7 is coupled to a source of liquid butane, absorbed for example by cotton in accurately predetermined proportions (2 grams of gas for 1 gram of cotton) with the object of filling the reservoir 9 under pressure, so that, before the regulation is carried out, the whole expansion unit thus constitutes a complete filling valve.

The screw 7 is then tightened in such manner as to compress the edge of the pastille 1 between the two annular surfaces $S_1$ and $S_2$ until the channel 2 has reached the desired diameter. The orifice of the bore 8 of the screw is closed and the device is then brought to an accurately determined temperature in a tank filled with liquid. After a period of 20 minutes in this tank, the bore 8 of the screw 7 is opened and the rate of flow is regulated by means of this screw by measuring the height of the flame produced by the gas which escapes through the bore 8 coming from the channel 2.

In a first series of tests, a screw 7 and a flanged member 3 of brass were employed. In a second series of tests, a screw 7 of brass and a flanged member 3 of polyhexamethylene-adipamide known by the term "nylon" were employed. Finally, in a third series of tests, a screw 7 of "nylon" and a flanged member 3 of "nylon" were employed. In view of the lack of strength of the threads of the screw 7 in this latter case, the preliminary compression of the pastille 1 was first carried out by means of a screw 7 of brass, and a "nylon" screw was then substituted for this first screw.

The heights of flame obtained during these three tests were as follows:

|  | 10° C., mm. | 20° C., mm. | 35° C., mm. |
| --- | --- | --- | --- |
| Brass flanged member, brass screw | 23 | 27 | 31 |
| "Nylon" flanged member, brass screw | 20 | 22 | 31 |
| "Nylon" flanged member, "Nylon" screw | 17 | 18 | 28 |

Under the same test conditions, a needle-valve flow regulator causes the height of the flame to vary between 5 and 6 mm. at 10° C. and 40 to 45 mm. at 35° C.

The above table shows that the height of the flame varies within acceptable limits without being affected by the coefficients of expansion of the polytetrafluoroethylene on the one hand and the materials constituting the base 3 and the screw 7 on the other hand. In particular, these coefficients of expansion are practically equal in the third test referred to above.

With a diameter $d$ which is larger than the value shown above, the results begin to be dissimilar ($d$=0.8 mm.), then the evolution of the flame is reversed since it becomes smaller as the temperature rises ($d$=1 to 1.5 mm.).

With a thickness $e$ which is less than the value indicated above, it is difficult to ensure fluid-tightness between the screw 7 and the member 3 and the creep is not sufficient to bring the diameter of the passage 2 down to a sufficiently small value by means of compression. With a thickness which is slightly greater than the value indicated above ($e$=2 mm.), the results obtained are comparable with those of the table.

When the device is utilized in a gas lighter, it is of advantage to use the hollow screw 7 as a housing for the usual closure valve in the interior of the screw.

As shown in FIG. 3, there is formed for this purpose in the interior of the screw $7_a$ a chamber 10 which opens to the exterior through the bore $8_a$ and in the interior of this chamber there is housed a sealing pastille 11 which is capable of being applied through the action of a spring 13 against a seating 12, also provided on the screw $7_a$. The spring 13 can act either directly on the pastille 11 if this latter is sufficiently strong from the mechanical point of view, or else as shown in the drawing, on a support 14 in which the pastille 11 is housed.

A push-rod 15 can act on the pastille 11 in the direction of opening.

The surface $S_2$ is preferably constituted by the lower surface of a plate or washer 16 which can be rigidly fixed to the screw $7_a$ or fixed by insetting the edge 17 of the screw $7_a$ after the pastille 11 (and, when so required, the support 14), the spring 13 and the push-rod 15 have been introduced in the chamber 10.

The surface $S_2$ is preferably given an external diameter which is less than the external diameter of the surface $S_1$ of the bottom of the member $3_a$, in such manner that the material of the pastille 1, which also tends to creep laterally towards the exterior of the compression zone, is thrust into the space which is left vacant between the member $3_a$ and the screw $7_a$ and thus increases the fluid-tightness by preventing the fuel from exuding through the threads $6_a$.

For this purpose, the external edge of the surface $S_2$ is preferably chamfered.

The internal edge of the surface $S_1$ and/or $S_2$ is also preferably chamfered (see surface $S_2$, FIG. 4).

These chamfers enable the creep and the elastic deformations to be directed by compressing the material of the pastille 1.

FIG. 4 shows an alternative form in which the members having the same function are designated by the same reference number followed by a distinguishing letter, insofar as their structure differs from that shown in FIG. 3.

The device shown in FIG. 4 differs from the device shown in FIG. 3 in its valve which is constituted by a disc 18 provided with a guide-rod 19 and a sealing joint 20, for example a toric joint as shown, while the spring $13_a$ is arranged in such manner as to apply the disc 18 against the wall of the end portion of the chamber $10_b$ with interposition of the joint 20, thus causing the rod 19 to project towards the exterior. It is understood that sufficient play is allowed to exist between the rod 19 and the bore $8_b$ for the flow of fuel. In this case, the washer $16_a$ can be provided with an annular edge $16_c$ adapted to guide the helicoidal spring $13_a$.

The member $3_a$ of the device of FIG. 3, or the member $3_b$ of the device of FIG. 4, can be fixed by welding or insetting on a reservoir $9_a$ of a gas lighter, for example of the type shown in FIG. 5.

As regards the lighter as a whole, it is provided with a reservoir $9_a$, which is fitted with a device such as that shown, for example, in FIG. 4, an igniting mechanism and a casing 21, the igniting mechanism being adapted to open the valve 18, 19, 20 and to strike a spark in proximity to a burner 22 coupled hermetically to the bore $8_b$ and placed on the downstream side of the said valve.

The lighting mechanism in question is provided with a fixed support 23 on which an oscillating support 25 is pivotally mounted about a shaft 24. The said oscillating support is pierced with a bore 26 which is initially aligned with the expansion-valve $3_b$ and terminates in the burner 22. The support 25 carries a knurled wheel 27 in contact with a flint 28. An operating push-rod 29 is fixed on a lever 30 which is pivotally mounted at one of its extremities at 31 on an eccentric 32 which drives the knurled wheel 27 through the intermediary of a ratchet and at its other extremity at 33, on one end of a connecting-rod 34, the other end of which is pivotally mounted at 35 on the oscillating support 25. A restoring spring 36, surrounding a shaft 37 rigidly fixed to the support 25, bears on the one hand on this support and on the other hand, against the lever 30 so as to return this latter towards the left of FIG. 5. A second spring 38, which is weaker than the spring 36, tends to move the support 25 away from the expansion-valve $3_b$.

The whole unit is completed by a flexible coupling 39 in the form of a sleeve adapted to couple in a fluid-tight manner the expansion-valve $3_b$ carried by the reservoir $9_a$ to the oscillating support 25, at least when this latter is in the lighting position. Although it is possible to fix this sleeve to the said support, it appears to be more effective to fix the said sleeve on the expansion-valve and more particularly by inserting the sleeve in a groove 40 supported by the screw $7_b$—$7_c$, so that this sleeve can also be used when filling the reservoir $9_a$, the support 25 being then moved away.

Finally, it is easy to provide means for limiting the travel of the pastille 1 towards the exterior after unscrewing the screw $7_b$, with the object of preventing an abrupt expulsion of all the parts by the pressure of the gas during any subsequent dismantling operation.

For this purpose, the member $3_b$ can be provided with a hollowed-out portion at the base of the thread so that when the pastille 1 creeps, this latter enters this hollowed-out portion and is retained by the threads $6_b$ if the screw $7_b$ is unscrewed.

By this means, a lighter is thus obtained which operates as follows:

When at rest (FIG. 5), the support 25 occupies its top position under the action of the spring 38, thus enabling the spring $13_a$ to maintain the valve 18, 19, 20 in the closed position, while the rod 19 projects towards the exterior of the screw $7_b$.

In order to operate the lighter, pressure is applied on the push-rod 29. The spring 38 yields first and the support 25 rocks about its shaft 24 up to the position of FIG. 4, while driving-in the rod 19, thus opening the valve 18, 19, 20. The pastille 1 is compressed to the required extent by the screw $7_b$ in order that the diameter and length of the channel 2 may be such that the fuel which is liquefied under pressure in the reservoir $9_a$ arrives in the gaseous state with a suitable rate of flow into the chamber $10_b$ of the valve. From this point, the fuel passes into the bore $8_b$, while the sleeve 39 prevents leakage, and terminates at the burner 22. When the support 25 comes up against its top, an additional travel of the push-rod 29 causes the knurled wheel 27 to rotate, thus igniting the gas jet issuing from the burner.

When pressure is no longer applied to the push-rod 29, the whole unit returns to its initial position, and the valve 18, 19, 20 ensures the closure of the reservoir.

In order to fill the reservoir $9_a$, it is preferable to proceed in the following manner. This reservoir being separated from the remainder of the lighter and the cap $7_b$ being unscrewed in such manner that the pastille 1 is not compressed and that the channel 2 has a maximum section, it is only necessary to fix on the expansion-valve a filling nozzle which is fitted in a similar manner to the portion of the support 25 shown in FIG. 4 and to carry out the filling operation, while the sleeve 39 prevents leakage from occurring between the said nozzle and the expansion-valve. When the filling is completed, it only remains to give the channel 2 its normal section and length of expansion by tightening the screw $7_b$.

It is understood that, instead of a valve which is opened by driving or pushing-in, a valve can be adopted which is opened by traction. As shown diagrammatically in FIG. 6, this valve can be constituted by a disc $18_a$ rigidly fixed to a rod $19_a$ which projects to the exterior of the screw $7_d$ and is pierced with a channel 41, while the disc $18_a$ is provided with a sealing-joint $20_a$ which can be applied by the spring $13_b$ against the annular edge $16_d$ of the washer $16_b$. The hollow rod $19_a$ can terminate directly in a burner $22_a$. It is useful to associate with an expansion-valve of this type an ignition mechanism adapted to lift the rod $19_a$, by resting, for example, on the flange 42 of the said rod, before directing a shower of sparks at the level of the burner $22_a$. At the time of filling, it is in this case necessary to provide additional means to ensure fluid-tightness between the filling nozzle and the expansion-valve.

Whichever method of construction is adopted, a lighter is thus obtained which has very real advantages. In particular, the expansion-valve regulating device constructed in accordance with the invention is economical to construct and provides a means of regulating with precision the rate of flow of fuel gas and of ensuring that, irrespective of the temperature of the gas which passes through the expansion-valve device, the rate of flow of the gas and consequently the height of the flame in the burner only vary between acceptable limits.

What I claim is:

1. In a fluid flow regulating device, in combination, a substantially cylindrical plug of elastically deformable material and having opposite annular end faces, a pair of central axial extensions projecting respectively in opposite directions from said end faces and a peripheral face extending between said end faces, said plug being formed with an axial bore therethrough for passage of a fluid through said plug; wall means having an inner peripheral surface abutting against said peripheral face of said plug over the whole length thereof for preventing radial outward expansion of said plug; and variable pressure means engaging said opposite annular end faces while leaving said central extensions free and unengaged for compressing said plug only along outer annular portions thereof to a variable degree to reduce thereby the inner diameter of said bore and to cause expansion of said unengaged central extensions of the plug in axial direction so as to regulate flow of fluid through said bore so as to permit a very gradual and substantially uniform contraction of said bore during application of pressure against the outer annular surface portions of said end faces of said plug.

2. In a fluid flow regulating device, in combination, a substantially cylindrical plug of elastically deformable material and having opposite annular end faces, a pair of central axis extensions projecting respectively in opposite directions from said end faces and a peripheral face extending between said end faces, said plug being formed with an axial bore therethrough for passage of a fluid through said plug; an elongated housing having a bottom wall and a peripheral wall, said bottom wall being formed with a central opening and said plug being located in said housing with one of its extensions projecting freely into said opening and with the annular end face adjacent said one projection abutting against an inner annular surface portion of said bottom wall about said opening, said peripheral wall of said housing having an inner smooth surface portion abutting against said peripheral face of said plug to prevent expansion of said plug in radially outward direction, said peripheral wall of said housing having above said inner smooth surface portion thereof an inner surface portion formed with an inner screw thread; and a hollow screw having an outer screw thread engaging the inner screw thread formed at the inner surface of said peripheral housing wall and having an annular end surface engaging the other annular end face of said plug while leaving the other plug extension free and unengaged, whereby when said screw is screwed toward said bottom wall of said housing, said plug will be compressed only along an outer annular portion thereof to a variable degree to reduce thereby the inner diameter of said bore and to cause expansion of said unengaged central extensions of the plug in axial direction so as to regulate flow of fluid through said bore.

3. An arrangement as defined in claim 2 in which said elongated housing has a cylindrical peripheral wall and in which said annular end surface of said screw has an outer diameter smaller than the inner diameter of said peripheral wall of said housing so that said annular end surface of said screw will leave, when said screw is screwed toward said end wall of said housing, an annular outer portion of said plug unengaged.

References Cited in the file of this patent

UNITED STATES PATENTS

| 2,319,498 | Gerard | May 18, 1943 |
| 2,442,746 | Anderson et al. | June 8, 1948 |
| 2,532,452 | Hoesel | Dec. 5, 1950 |

FOREIGN PATENTS

| 1,084,136 | France | June 30, 1954 |